(No Model.)

6 Sheets—Sheet 1.

J. H. ROGERS.
APPARATUS USED IN THE MANUFACTURE OF TIN OR TERNE PLATES.

No. 496,487.

Patented May 2, 1893.

Witnesses
Baltus D. Long
B. W. Miller

Inventor
John Henry Rogers
By his Atty's.
Baldwin, Davidson & Wight (No Model.) 6 Sheets—Sheet 2.

J. H. ROGERS.
APPARATUS USED IN THE MANUFACTURE OF TIN OR TERNE PLATES.

No. 496,487. Patented May 2, 1893.

(No Model.)
6 Sheets—Sheet 3.

J. H. ROGERS.
APPARATUS USED IN THE MANUFACTURE OF TIN OR TERNE PLATES.

No. 496,487.
Patented May 2, 1893.

(No Model.) 6 Sheets—Sheet 4.
J. H. ROGERS.
APPARATUS USED IN THE MANUFACTURE OF TIN OR TERNE PLATES.

No. 496,487. Patented May 2, 1893.

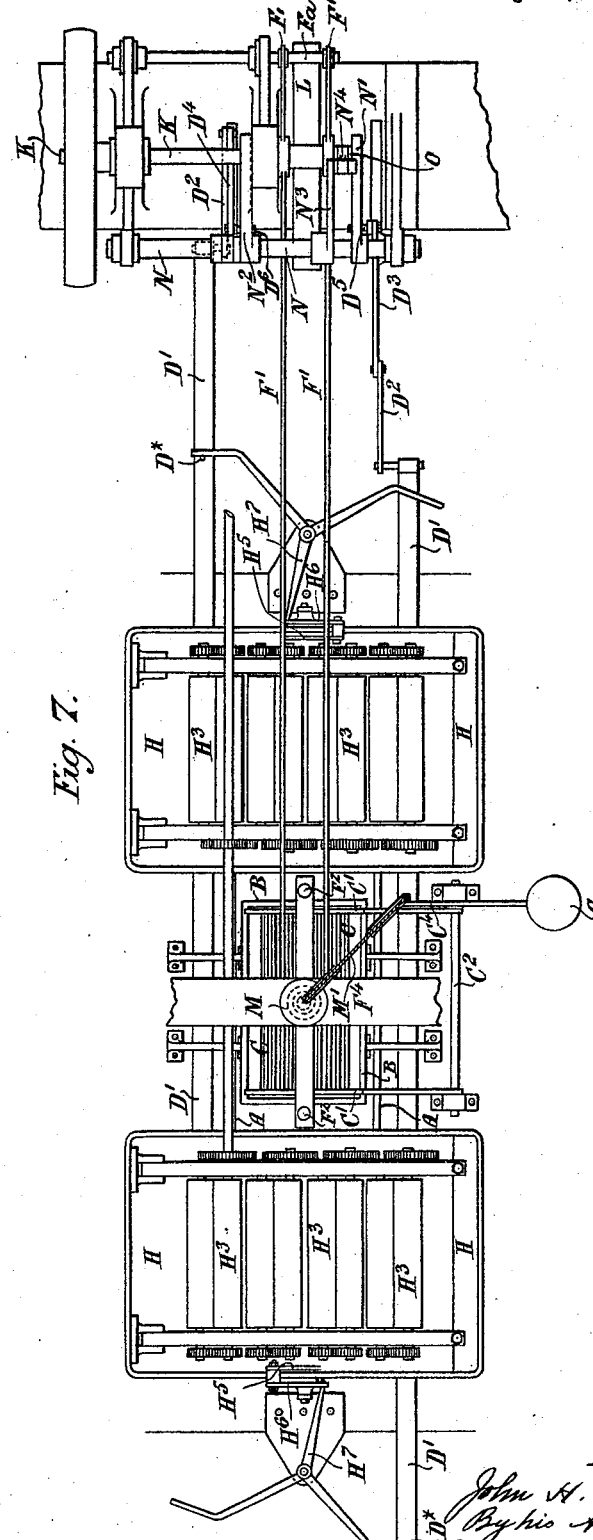

(No Model.)
6 Sheets—Sheet 6.
J. H. ROGERS.
APPARATUS USED IN THE MANUFACTURE OF TIN OR TERNE PLATES.
No. 496,487. Patented May 2, 1893.
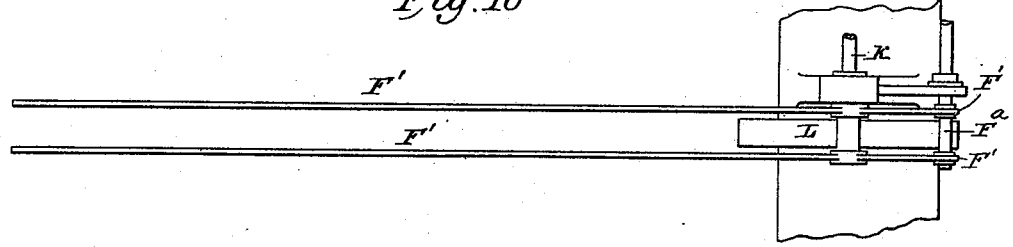
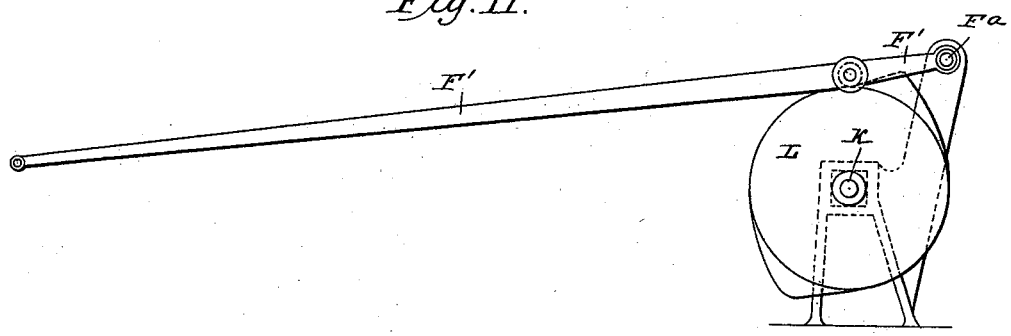
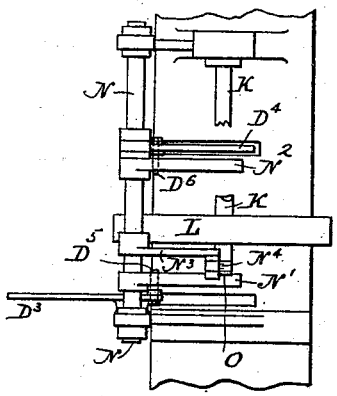
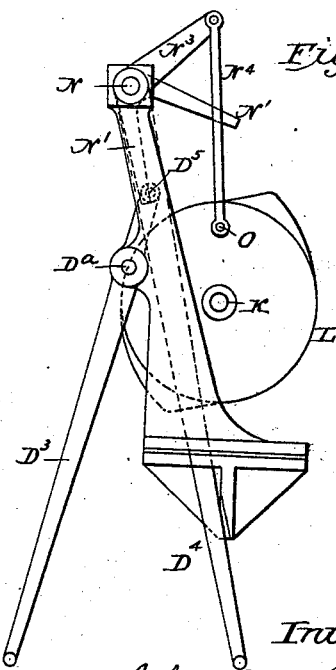
Witnesses:
Milton O'Connell
Baltus DeLong
Inventor,
John Henry Rogers,
By his attys
Baldwin Davidson Wight

UNITED STATES PATENT OFFICE.

JOHN H. ROGERS, OF GLYNCOED, ENGLAND.

APPARATUS USED IN THE MANUFACTURE OF TIN OR TERNE PLATES.

SPECIFICATION forming part of Letters Patent No. 496,487, dated May 2, 1893.

Application filed May 3, 1892. Serial No. 431,701. (No model.)

*To all whom it may concern:*

Be it known that I, JOHN HENRY ROGERS, tin-plate manufacturer, a subject of the Queen of Great Britain, residing at Glyncoed, Llanelly, England, have invented certain new and useful Improvements in Apparatus Used in the Manufacture of Tin or Terne Plates, of which the following is a specification.

The object of my invention is mainly to insure uniformity in the coating of the plates by insuring that all plates shall be introduced at a uniform speed into the bath of coating metal, that they shall all remain in the bath for a uniform length of time and shall all be withdrawn uniformly at the same speed. Heretofore these objects have usually been more or less attained by carrying the plates through the bath of coating metal at a uniform speed by pairs of revolving rollers immersed in the bath. The use however of rollers for carrying the plates into and out of the bath is attended with many disadvantages.

According to my invention I construct apparatus in such manner that the plates to be coated are first placed into compartments of a rack which is above the pot containing the coating metal and are by mechanism actuated by a continuously revolving shaft taken automatically from this rack and lowered through a flux pot into the compartments of a rack which is immersed in the coating metal, then carried by this rack in a horizontal direction through the metal and finally lifted from the pot through a grease pot on the top of the metal bath.

The drawings annexed show an apparatus constructed in the manner I prefer for carrying out my invention.

Figure 1:
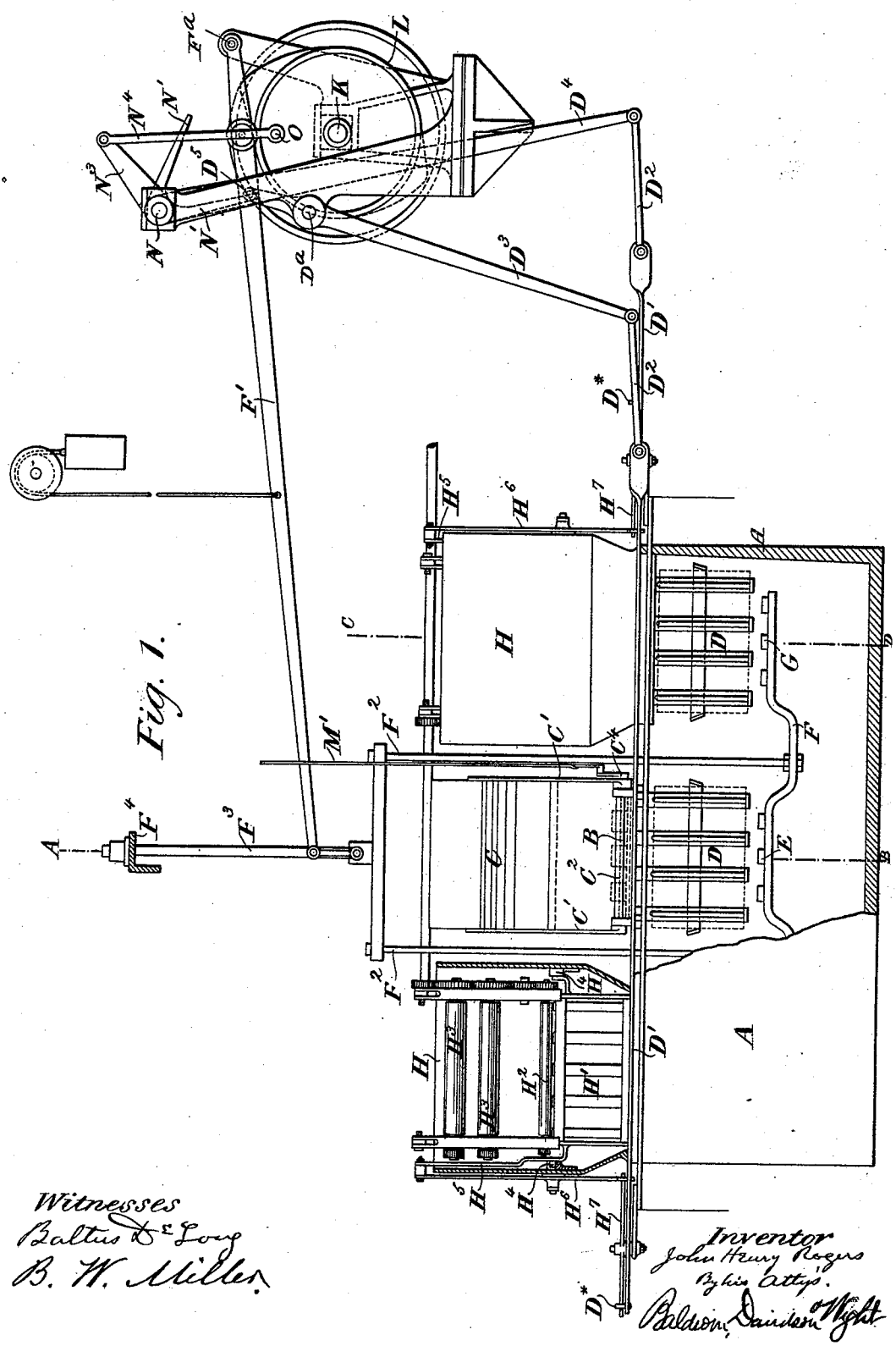
Figure 2:
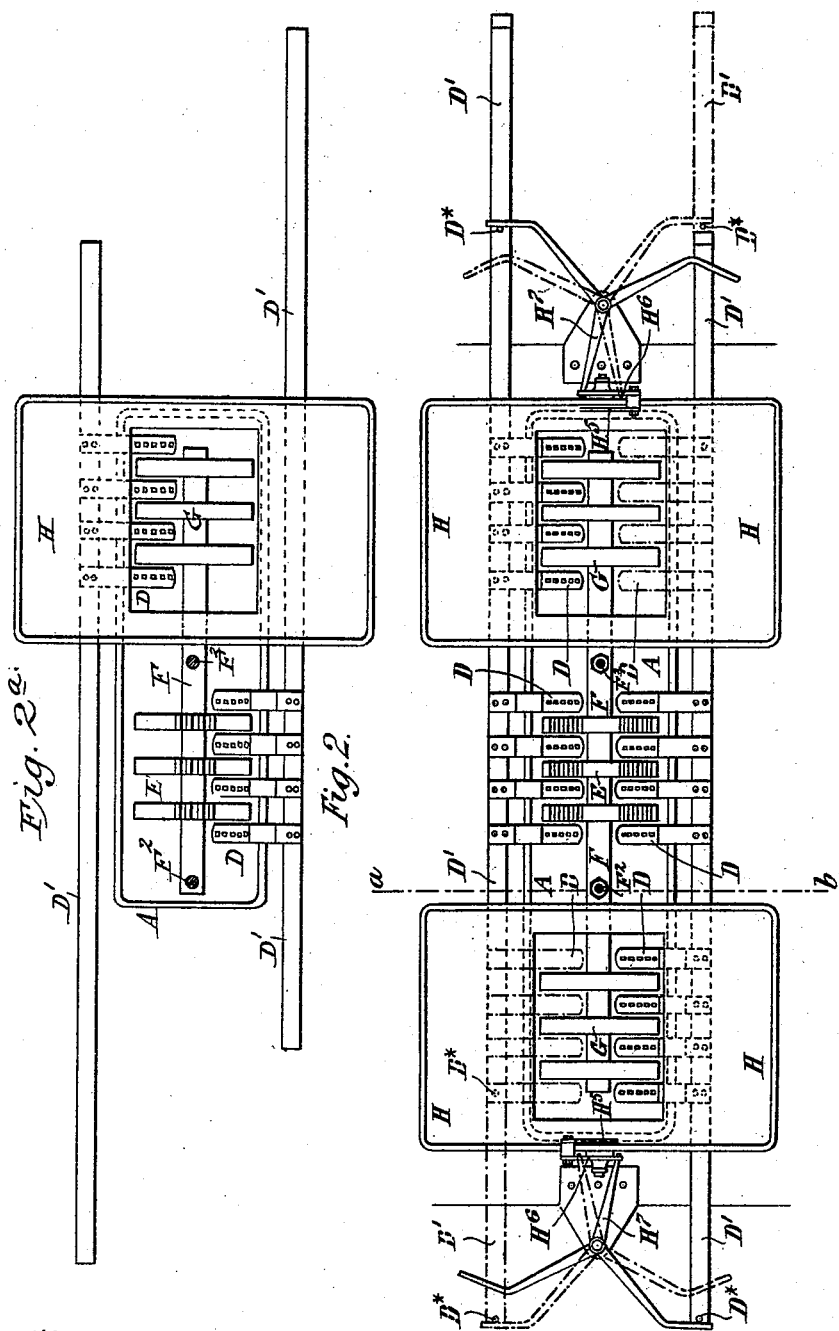
Figure 3:
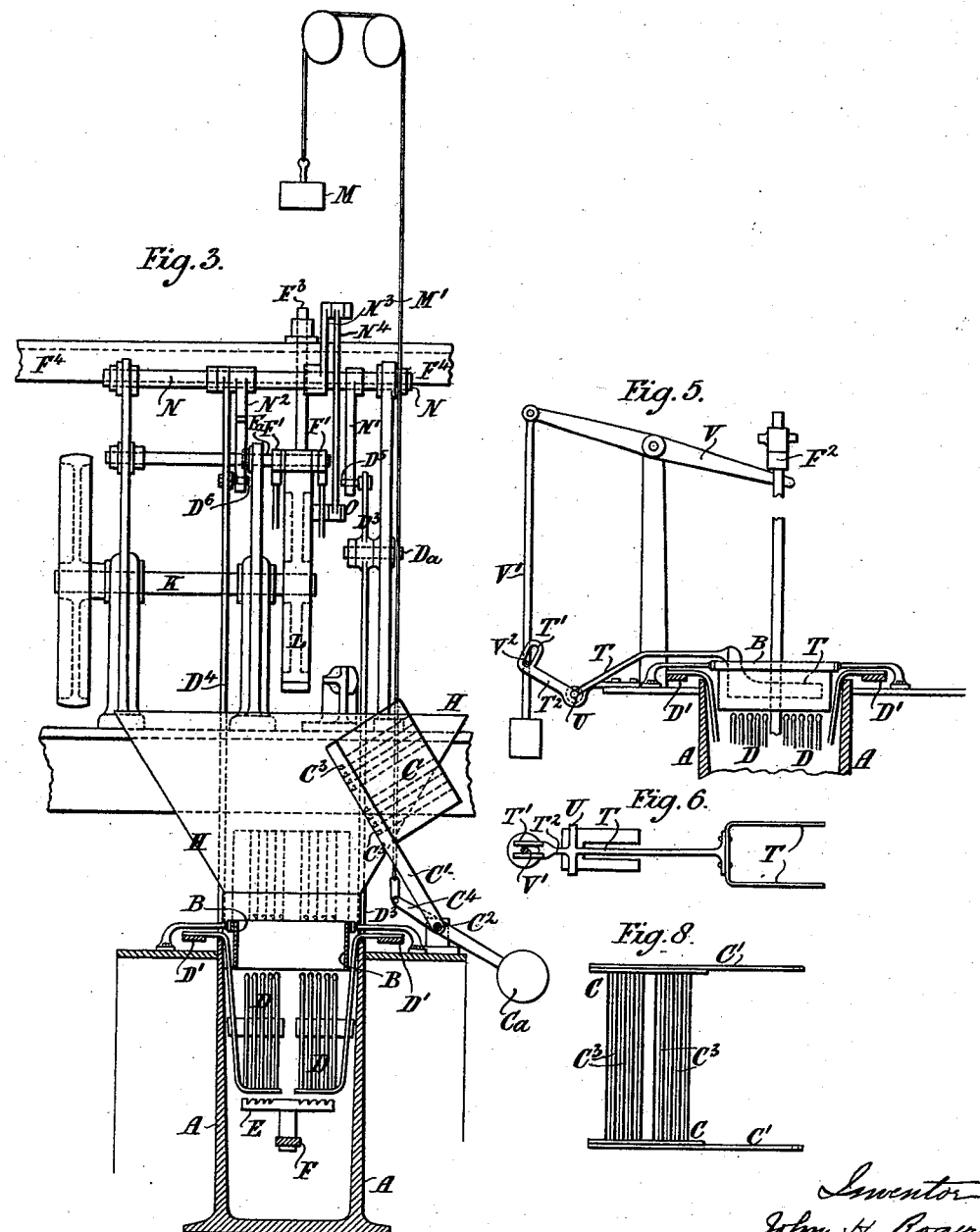
Figure 4:
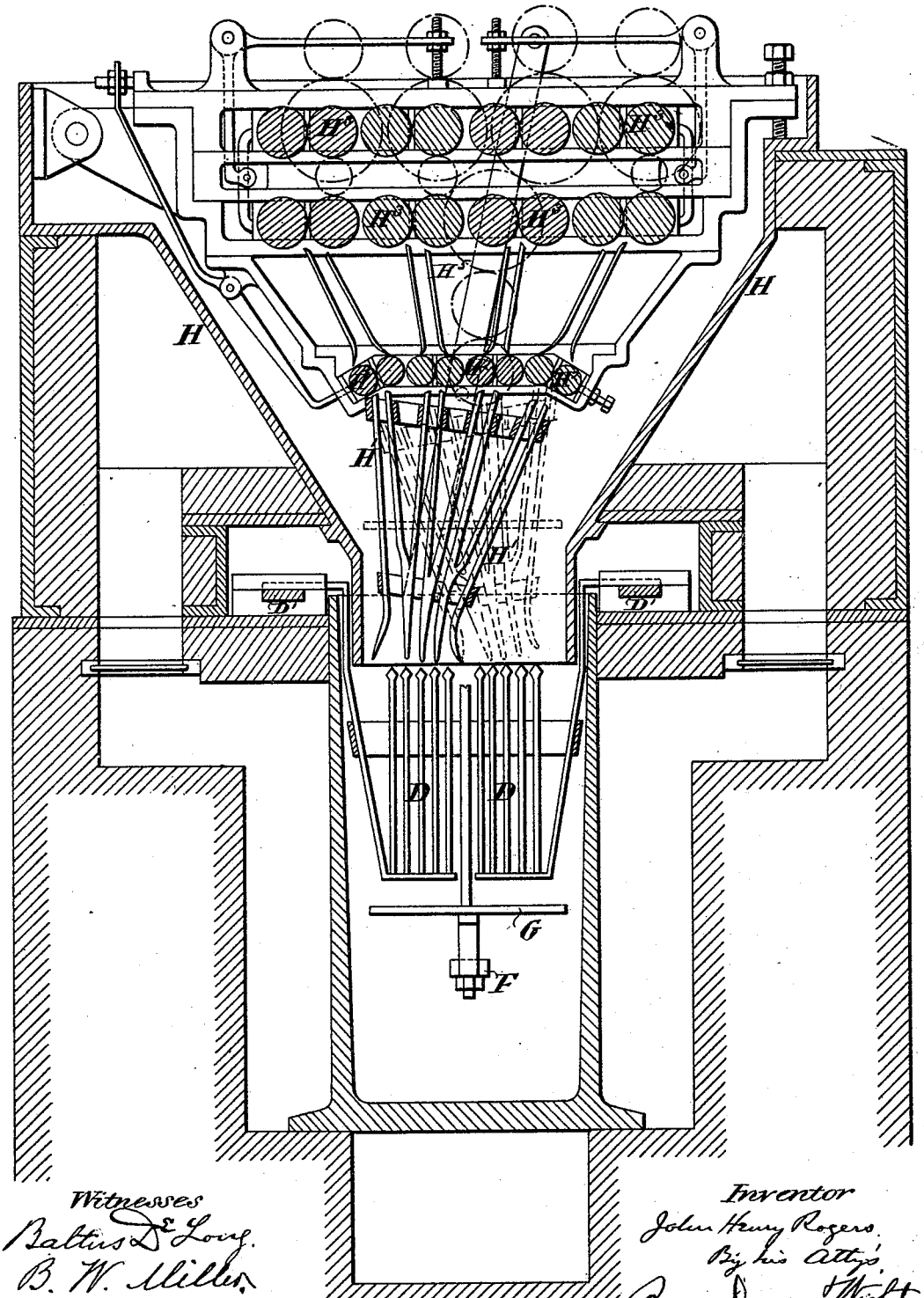

Figure 1 is a side elevation partly in section. Fig. 2 is a plan of the metal pot and grease pots above it. Fig. 2$^a$ is a plan view of the modification. Fig. 3 is a vertical cross section through the line A B Fig. 1. Fig. 4 is a vertical section on a larger scale through the line C D. Fig. 5 is a vertical section of mechanism for pressing plates down into the coating metal. Fig. 6 is a plan of part of the same. Fig. 7 is a plan of the whole apparatus. Fig. 8 is a plan and Fig. 9, a vertical section, of the rack C. Fig. 10 is a plan, and Fig. 11, a side view, of the levers F′, and the cam which operates them. Fig. 12 is a plan, and Fig. 13, a side view, of the levers D$^3$, D$^4$, and the parts which operate them.

A is the pot of coating metal kept heated in any desired manner. B is a flux box above it. C is a rack above the flux box. It is divided into eight or it might be other number of compartments each for receiving a separate plate. The rack is carried by an arm C′ which extends from a rock shaft C$^2$. When the rack is to be filled with plates it is turned upward into an inclined position and when the plates are to be taken from it it is lowered into a vertical position as shown in Fig. 3. The partitions of the rack are as shown formed with ledges C$^3$ at the bottom on which the bottoms of the plates rest.

C$^a$ is a balance weight to partially counterbalance the weight of the rack.

D D are two pairs of racks immersed in the coating metal in the pot A, one pair carried by a bar D′ which extends along one side of the pot and can be moved endwise to and fro through suitable bearings and the other pair carried by a similar bar D′ which is on the opposite side of the pot. When one bar D′ is moved in one direction the other bar is moved in the opposite direction and at the end of each movement one of the two racks which each bar carries is always brought to the center of the pot and into a position to have plates lowered into it from the rack C. Each rack D is formed with four compartments if the rack C is formed with eight compartments so that when these racks are at rest there are in the two racks which are then at the center of the bath eight compartments ready to receive eight plates from the eight compartments of the rack C.

To take the plates from the rack C and lower them into the racks D lifting tables E are used. The racks are in vertical sections or divisions and the lifting tables E can be raised or lowered through the spaces between these divisions. The lifting tables are serrated on the top as shown in Fig. 3. When the lifting tables are raised the inclines of the serrations come below the plates and lift them at the same time that they move them sidewise and take them off from the ledges C$^3$ so that the plates then rest on the lifting tables and when these tables are moved downward the plates go down with them clear of the ledges and are carried down into the compartments of the racks D.

The lifting tables E are carried by a horizontal longitudinal bar F. This bar at its ends has lifting tables G extending from it similar to the tables E but without the serrations on the top. When the bar F is raised the lifting tables G raise the plates which are in those racks D which are at the ends of the pot and pass the plates up in guides H' which lead them to pairs of rollers H² in the grease pot H and from these the plates are led up out of the grease pot through other rollers H³ and taken away by an attendant as they come from these rollers.

As the racks D which are at the ends of the pot and which have to have plates taken up from them are at one time at one side of the pot and at the next time at the opposite side the lower ends of the guides H' have at one time to be brought into position to receive plates from the one rack and at the next time from the other rack. To admit of this the guides have a rocking motion given to them in the following manner. They are all secured together in one frame which at its ends is supported on axes H⁴. An arm H⁵ also extends upward from the frame and at its upper end is coupled to the upper arm of a lever H⁶, which is on the outside of the pot. The lower arm of this lever is coupled to one axis of a lever H⁷ two other arms of which are acted upon alternately by pins D* on the bars D' that carry the racks D. In this way the guides H' are rocked to one side or the other each time that the bars D' are moved endwise in opposite directions.

K is a revolving shaft from which motion is transmitted to the various parts of the apparatus. A cam L upon it gives movement to a pair of lever arms F' which turn on an axis Fª, and at their ends carry a frame F² to which the bar F is attached and gives an up and down movement to this bar. The frame F² has a vertical guide bar F³ rising up from it and extending through a fixed guide F⁴.

Above the top of the guide bar F³ is suspended a weight M by a wire cord M' which passes over guide pulleys and downward to an arm C⁴ fixed on the rock shaft C² which carries the rack C. When the frame F² and vertical guide bar F³ are raised the guide bar lifts the weight M and then the rack C is lowered into position just above the flux box B and the rack remains down in this position so long as the weight is upheld by the guide bar F³. When this bar has descended far enough to allow the weight to hang upon the cord M' the rack C turns upward into an inclined position and when in this position plates can readily be placed into it by an attendant. It is however evident that if preferred, the rack C might always be held in one fixed position vertically above the metal pot and the plates be placed into as well as taken from it while it is in this position.

The bars D' have movement given to them simultaneously in opposite directions by their being connected by links D² one to a lever D³ the other to a lever D⁴. The lever D³ is continued beyond the axis Dª on which it rocks and a pin D⁵ extending from this continuation is moved first in one direction and then in the opposite direction by arms N' N' on a rocking shaft N. Similar arms N² N² on this shaft act on a pin D⁶ which extends from the lever D⁴ and from the time that one of each pair of arms leaves the pin till the other one comes into contact with it the levers and therefore the racks remain at rest. The shaft N has a rocking motion given to it by an arm N³ which extends from it, being coupled by a rod N⁴ to a crank pin O which stands out from one side of the cam L.

The operation of the machine is as follows:— One boy fills eight plates into the rack C whenever it is raised into its inclined position. As the shaft K revolves the filled rack is lowered into position over the grease pot. The lifting tables then rise and take the plates from the rack and deliver them into two of the racks D which are below it. These racks are then shifted one to one end of the metal bath and the other to the opposite end. The lifting tables are next caused to rise and raise the plates up from these racks and deliver them to the rolls H² in the grease pots H and other boys take the plates from the rolls one by one and pass them on to be finished preferably by being passed through bran or other cleaning material and subsequent dusting. At the same time the tables again take other fresh plates which are to be coated from the rack C which has again been filled and so the work goes on. In some cases when coating with a metal which is of high specific gravity it is necessary to apply means to depress the plates down into the coating metal. In such cases I complete the immersion of the plates in the metal by causing arms T shown in Figs. 5 and 6 to descend down on to them as they are being lowered into the racks D. The arms are carried on a rock shaft U and are moved at the required time by the top bar of the frame F² then coming down on to one arm of a lever V from the other arm of which a weighted rod V' hangs down and a pin V² on the rod enters a slot T' in a second arm T² on the rock shaft U. When the guide rod again ascends the weighted rod lifts the arms T into their normal positions.

It is not essential that the apparatus should be constructed as above described in such manner that the plates to be coated are lowered into the coating metal at the center of the bath and then some carried to one end of the bath and the others to the opposite end of the bath but in most cases I prefer to do so.

It is clear that the portion of the apparatus on the left-hand side of line a b, Fig. 2, might be omitted and the rods D' be made to carry a single rack only, as shown in Fig. 2ª; the plates to be coated would then be lowered into the coating metal at one end of the bath and be raised from it at the opposite end. It is also evident that one of the rods D' and the rack or racks carried by it might be omitted and one rod only with a rack or racks upon it be used.

The advantages attained by coating plates by machinery constructed as above described are—the iron or steel plates can be left as short a time in the coating metal as is consistent with proper coating, and in this way a plate can be made of any quality with a minimum of coating metal, as the longer a plate remains in the metal the more soaks into the pores of the plate and disappears. The plate can be passed at a slow and uniform speed through the flux into the metal so as to insure thorough and equal coating. A larger amount of plates can be coated in a given time with a certain quantity of coating metal lying idle. The amount of labor required to coat a given quantity of plates is much reduced.

What I claim is—

1. The combination of a pot for coating metal, a rack above it into which the plates to be coated are placed, a grease pot above the metal pot, a rack within the metal pot, means for moving this rack horizontally to bring it alternately below the upper rack and below the grease pot and to carry any plates placed within it edgewise through the metal, and a lifting appliance provided with means for reciprocating it and taking the plates at one time from the upper rack and lower them into the rack in the metal pot and at another time to raise the plates up from this rack into the grease pot.

2. The combination of a pot for coating metal, a rack above it, a grease pot above the metal pot, a rack within the metal pot, mechanism for moving this rack horizontally and bringing it to rest alternately below the upper rack and below the grease pot, a lifting appliance provided with means for reciprocating it, and for taking the plates from the upper rack and lowering them into the rack in the metal pot and also for raising the plates from this rack into the grease pot, mechanism for giving an up and down movement to this lifting appliance at the time when the rack is at rest and a continuously revolving shaft provided with means for connecting it with the rack and lifting apparatus from which the movements are given at the proper times to the rack and lifting appliance in the metal pot.

3. Apparatus to be used in the manufacture of tin and terne plates constructed with a rack above the center of a long pot or bath for coating metal—two pairs of racks immersed in the metal and capable of being moved endwise in opposite directions so that at one time two racks one of each pair may be at the center of the bath ready for plates to be lowered into them and the other rack of each pair may be one at one end of the pot and the other at the other end of the pot, a lifting table to take the plates from the supply rack and lower them into the immersed racks which have been brought below it and to lift the plates from the racks which are at the ends of the pot, and means for moving the racks which are in the metal pot and the lifting table at the proper times.

4. The combination of the pot for coating metal, the two pairs of racks within the pot, mechanism for shifting these pairs of racks endwise and for lowering plates into them whenever they are brought to the center of the pot and for raising the plates out of the racks whenever they are brought to the ends of the pot; the grease pots above the two ends of the pot, the pairs of rolls within these pots, the guides for leading the plates to these pairs of rolls and mechanism for rocking the guides to bring them into position for leading the plates to the rolls from whichever rack the plates are being lifted.

5. The combination of the pot for coating metal, the rack above it with a ledge at the bottom of each of its partitions for plates to rest on, the lifting table with inclines on its upper surface, means for raising and lowering this table so as at one time to bring the inclines against the bottom edges of the plates, move them off the ledges of the rack and then descend with the plates resting on it into the pot and means for subsequently raising the plates from the pot.

6. The combination of the lifting tables, the supplying racks, means for operating the lifting tables to take the plates out of the supplying racks, means for operating the tables to lower the plates into the metal, and means for operating the tables to raise the plates out of the metal.

J. H. ROGERS.

Witnesses:
GEORGE BERESFORD,
HERBERT D. REES,
*Both of Llanelly.*